United States Patent [19]
Maendl et al.

[11] Patent Number: 5,943,120
[45] Date of Patent: *Aug. 24, 1999

[54] METHOD AND APPARATUS FOR MAKING PHOTOGRAPHIC PRINTS FROM NEGATIVES

[75] Inventors: Matthias Maendl, Grosshelfendorf; Manfred Fuersich, Taufkirchen, both of Germany

[73] Assignee: AGFA-Gevaert Aktiengesellschaft, Leverkusen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/700,658

[22] Filed: Aug. 9, 1996

[30] Foreign Application Priority Data

Sep. 29, 1995 [DE] Germany ............ 195 36 584

[51] Int. Cl.⁶ .................................................. G03B 27/72
[52] U.S. Cl. ..................................... 355/35; 355/77
[58] Field of Search ....................... 355/35, 38, 77; 358/519

[56] References Cited

U.S. PATENT DOCUMENTS

| | | | |
|---|---|---|---|
| 3,724,947 | 4/1973 | Paulus | 355/38 |
| 3,753,707 | 8/1973 | Burger et al. | 96/27 |
| 3,831,021 | 8/1974 | Muhlogger | 240/41 R |
| 4,154,523 | 5/1979 | Rising et al. | 355/58 |
| 4,175,856 | 11/1979 | Pone, Jr. | 355/68 |
| 4,206,998 | 6/1980 | Tokuda | 355/77 |
| 4,222,661 | 9/1980 | Wahli et al. | 355/38 |
| 4,239,385 | 12/1980 | Hujer | 355/71 |
| 4,757,351 | 7/1988 | Birgmeir | 355/38 |
| 4,933,754 | 6/1990 | Reed et al. | 358/76 |
| 5,223,892 | 6/1993 | Ikenoue et al. | 355/77 |
| 5,311,251 | 5/1994 | Roule et al. | 355/77 |
| 5,333,034 | 7/1994 | Gu et al. | 355/32 |
| 5,353,095 | 10/1994 | Terashita | 355/38 |
| 5,528,392 | 6/1996 | Nakagawa et al. | 359/41 |
| 5,589,954 | 12/1996 | Watanabe | 358/518 |
| 5,612,903 | 3/1997 | Miller | 364/526 |

FOREIGN PATENT DOCUMENTS

| | | |
|---|---|---|
| 3637994 | 5/1987 | Germany . |
| 3603249 | 8/1987 | Germany . |
| 601839 | 7/1988 | Switzerland . |

OTHER PUBLICATIONS

"Fotografische Verfahren mit Silberhalogeniden" von Fr. Werner Walther, VEB Fotokinoverlag Leipzig pp. 216–219.

*Primary Examiner*—Safet Metjahic
*Assistant Examiner*—John Chizmar
*Attorney, Agent, or Firm*—Milde, Hoffberg & Macklin, LLP

[57] ABSTRACT

The present invention concerns a method of making photographic prints on stock from negatives that differ in density range. The appropriateness of the exposure gradient of the stock for the particular negative is ensured by employing stock with a definite "contrast-Schwarzchild-effect" and by so varying the intensity of the light that the negative is exposed to during printing that the gradient is adapted to the characteristics of the particular negative as a function of the accordingly varied printing time.

15 Claims, 4 Drawing Sheets

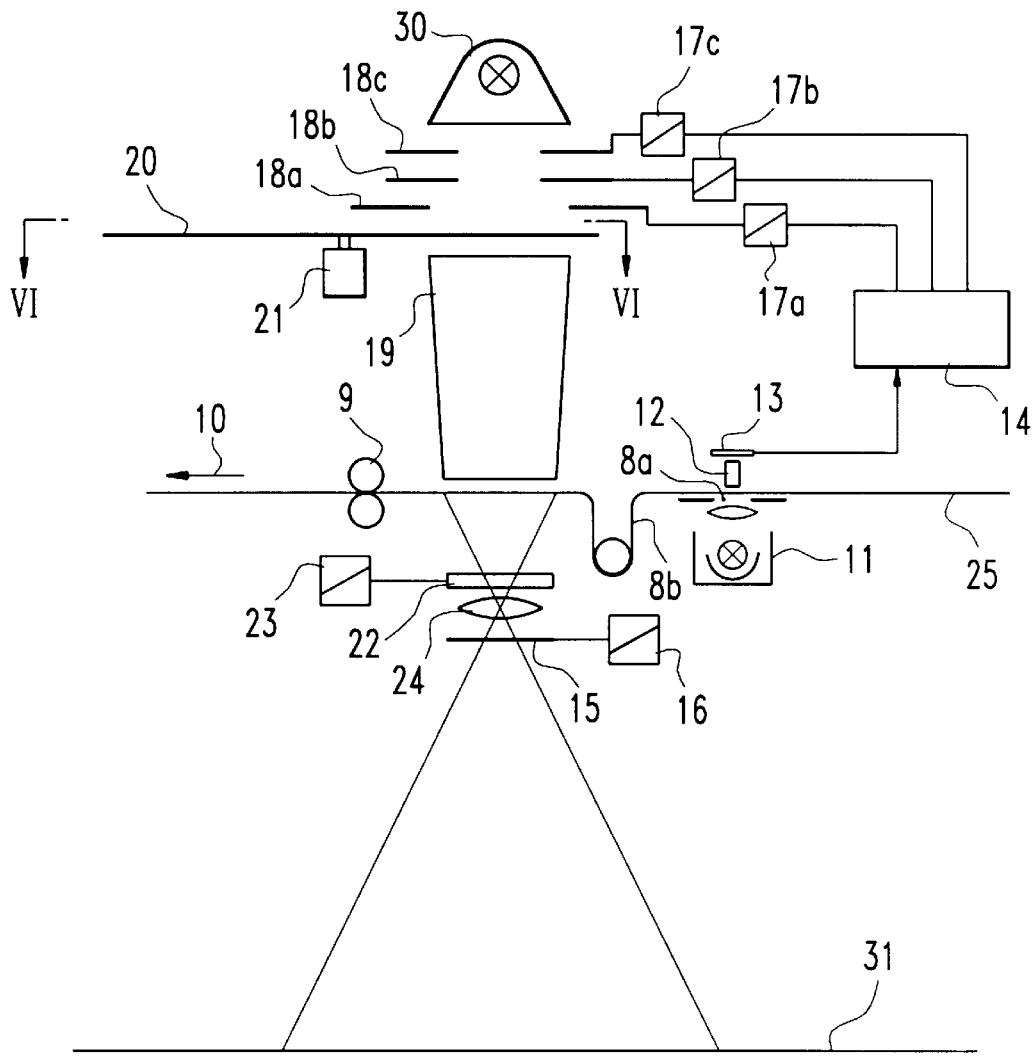
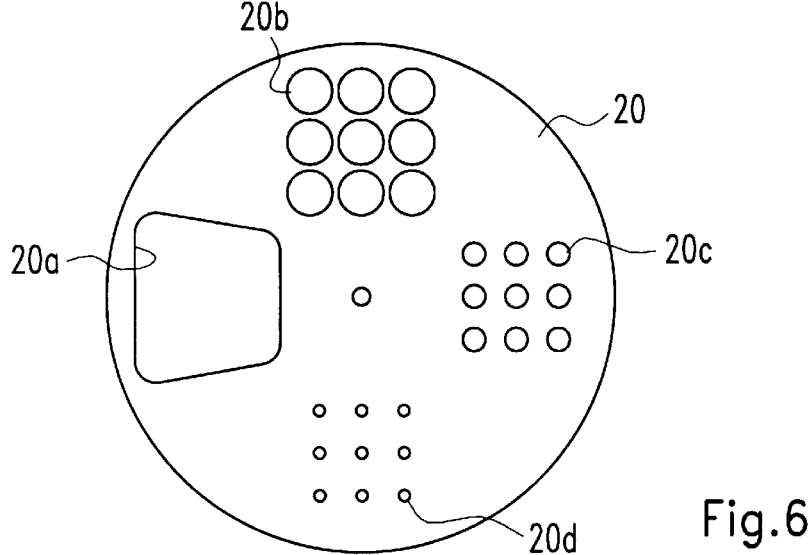
Fig.5
Fig.6

METHOD AND APPARATUS FOR MAKING PHOTOGRAPHIC PRINTS FROM NEGATIVES

BACKGROUND OF THE INVENTION

The present invention concerns a method and apparatus for making photographic prints on stock from negatives that differ in density range.

The negatives that photographic prints are made from often have very different ranges of density, meaning that the difference between the darkest point and the lightest point of the negative can be either very great or very small. Since the contrast or "exposure gradient" of the photographic stock—that is, the slope of the photographic density curve—is related over a specific range of densities to a mean negative density range, it is impossible to make really satisfactory prints from negatives with densities at either extreme. Negatives with a narrow range of densities, very underexposed for example, will result in very flat prints. Ordinary stock will also not correctly represent the difference in density characteristic of negatives with a very wide density range; for example, overexposed, flash, or back-lit negatives. There has accordingly been a need to adapt the gradient of the stock to the type of negative.

Two methods of controlling the gradient when printing from black-and-white negatives have been known for some time. The first uses a very harsh stock subjected to lower-threshold preliminary illumination. The second employs a special type of stock with two coatings of different gradient, one sensitive to blue and the other to yellow, and adjusts the harshness of the stock by subjecting it to specific proportions of blue and yellow light. These approaches, which are disclosed in the U.S. Pat. No. 3,753,707, cannot be employed to make color prints.

One contemporary method constitutes unsharp masking of the printing light with an LCD matrix actuated point-by-point by a computer. When the negative has a wide range of densities, the matrix will decrease the intensity of the printing light in the lightest areas, confining the range to the capacities of the stock. However, this method, which is disclosed in the U.S. Pat. No. 4,239,385, is relatively complicated.

SUMMARY OF THE INVENTION

A principal object of the present invention is accordingly to provide relatively simple means of controlling the exposure gradient in color-photography stock.

This object, as well as other objects which will become apparent from the discussion that follows, are achieved, in accordance with the present invention, by the method of selecting stock with a definite contrast-Schwarzchild-effect to match the gradient of the stock to the requirements of the particular negative; and selecting the printing time and the intensity of the light that the negative is exposed to during printing such that the gradient is adapted to the characteristics of the particular negative as a function of the printing time.

The point of departure for the present invention is the awareness that many photographic papers, chloride papers for example, have a very noticeable "contrast-Schwarzchild-effect", meaning that their γ value changes considerably with exposure time. Negative papers that contain much silver chloride for example exhibit a γ of 3.2 at an exposure of 40 msec and a γ of 3.7 at an exposure of 1 second. Since, on the other hand, such contemporary photographic papers are generally very sensitive and since a lot of light is emitted from the lamp housings of contemporary printing equipment even when the printing light is relatively dim, an increasing number of just barely exposed negatives are being encountered for which the intensity of the printing light must be decreased to prevent exposures from being abbreviated beyond a point that can be handled by mechanical shutters. It accordingly becomes possible, without essentially decreasing printing output, to control printing exposure over the total negative by controlling exposure intensity at the negative level such that each print will have more or less the gradient desired for its associated negative. A lamp housing with a very high light output and a high range of dynamics within the exposure strength of the negative is naturally necessary.

This potential can already be achieved to some extent with photographic printing stock currently available on the market. On the other hand, it would also be easy to develop various types of stock. One type of stock could have a greater powerful contrast-Schwarzchild-effect that could be exploited to control the contrast, satisfying all specifications when printing from either harsh or soft negatives. Another type of stock would feature a contrast that decreases with increasing exposure time.

For a full understanding of the present invention, reference should now be made to the following detailed description of the preferred embodiments of the invention as illustrated in the accompanying drawings.

BRIEF DESCRIPTION OF THE DRAWINGS

FIG. 5 is a schematic illustration of a printer wherein the gradient of photographic stock, with a γ value like that of the paper represented in FIG. 2, can be controlled.

FIG. 6 illustrates a light reducer viewed along the line VI—VI in FIG. 5.

DESCRIPTION OF THE PREFERRED EMBODIMENTS

Figure 1:
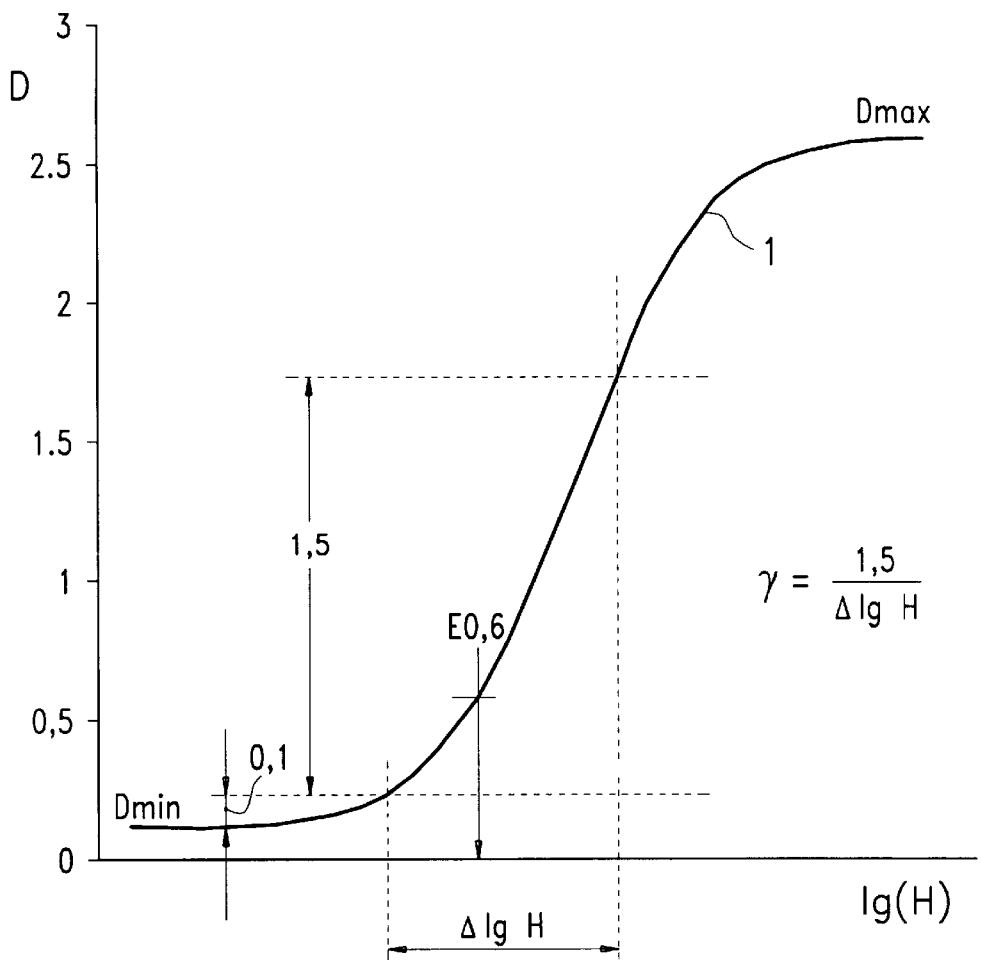
FIG. 1 is a density curve of photographic stock intended for making prints from negatives.

The preferred embodiments of the present invention will now be described with reference to FIGS. 1–7 of the drawings. Identical elements in the various figures are designated with the same reference numerals.

FIG. 1 is a photographic density curve for black-and-white photographic stock. The abscissa represents light quantity as the product of intensity and effect time in a logarithmic scale. The ordinate represents densities from 0 to 3, also in a logarithmic scale. Curve 1 is substantially S-shaped and, after normalization, the contrast curve can be considered to be the slope of a straight line two points along the curve, the lower point 0.1 above minimal density $D_{MIN}$ and the upper point 1.5 units above the first. The slope can be obtained as the quotient 1.5 over the distance Δ between the reflections of the points on the abscissa. Each layer of color in a sheet of color stock will be associated with such a curve, and they should be as similar as possible.

Figure 2:
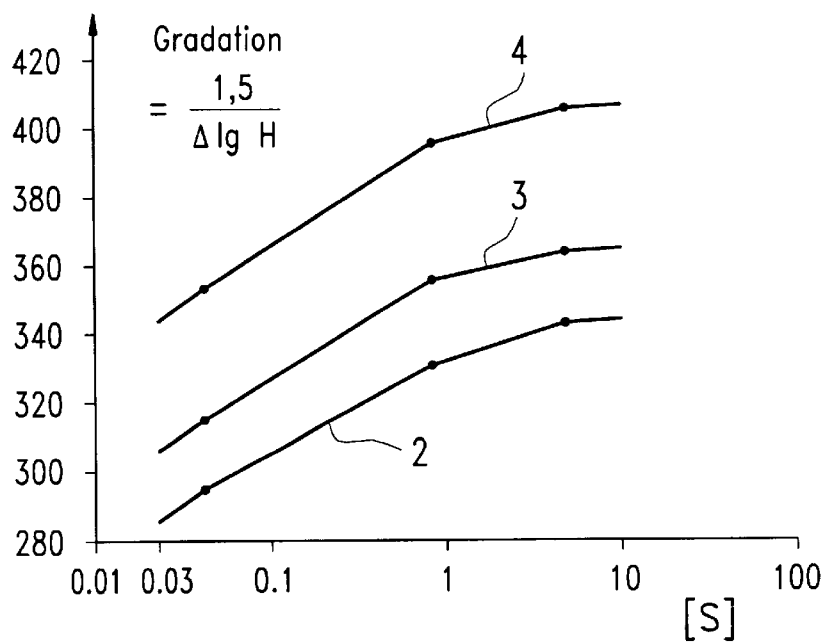
FIG. 2 is a contrast or gradient curve of a silver-chloride paper exposed for 0.03 to 10 seconds.

The slopes of these lines, however, are not constant for all exposure times but definitely dependent thereon as will be evident from FIG. 2. Here, curve segments 2, 3, and 4, which represent the γ for each layer, are at different heights, depending on the various starting values of the different layers in the stock, although essentially parallel. The γ changes very rapidly between the lower threshold of the exposure time characteristic of a high-speed printer operating at 30 msec and a duration of 10 seconds, which is definitely the upper level for a reasonable operation. Lower curve 2 for example increases from approximately 0.285 at 0.03 seconds to approximately 0.345 at 10 seconds. Curves 3 and 4 increase percentually at approximately the same amounts.

Depending on the sequence of layers and on the particular silver-halide emulsions employed, it is possible to produce stock with gradients that either increase more steeply or definitely decrease with increasing time. Ideally, the gradient for the majority of stocks with a mean density range will be in the vicinity of the moderately rapid time of approximately 100 msec, where printing output will be least affected.

Figure 3:
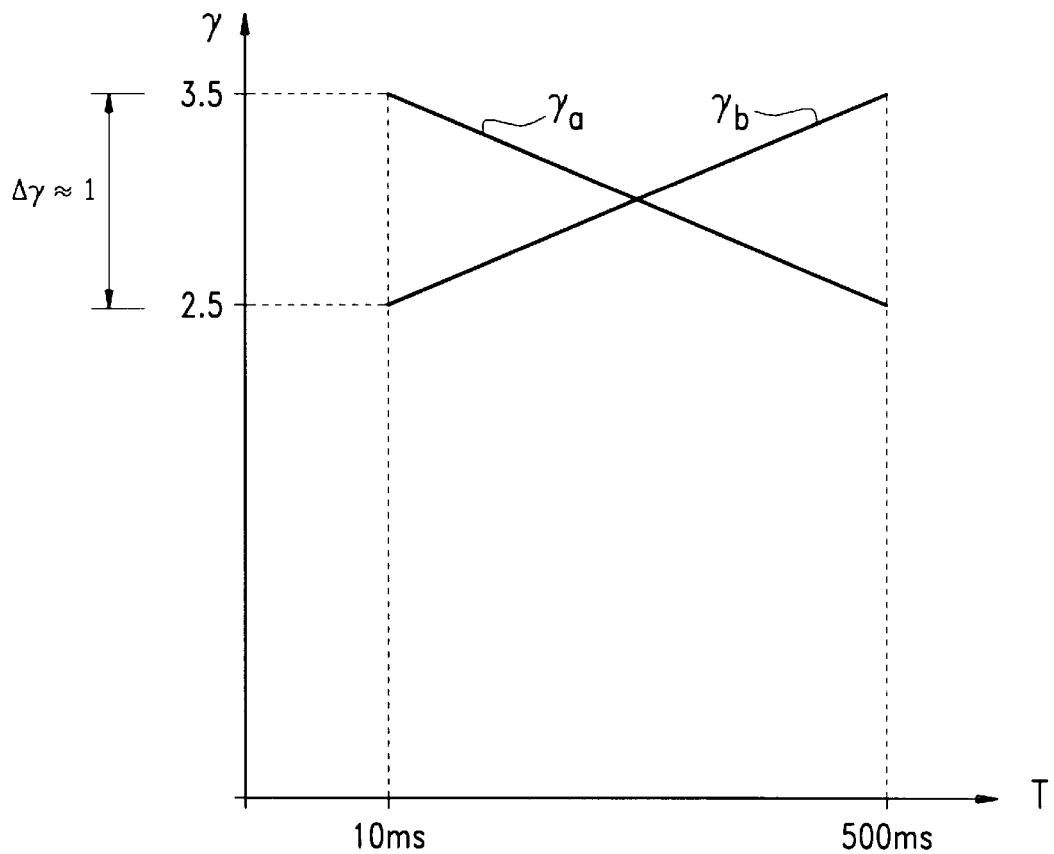
FIG. 3 is a contrast or gradient curve of a paper ideal for high-output printers.

A gradient over exposure time T for stock optimized for a high-output printer is represented by the purely qualitative curve $\gamma_a$ illustrated in FIG. 3. It decreases from approximately $\gamma_{10\ ms}=3.5$ to $\gamma_{500\ ms}=2.5$, approximately 1, that is, between the exposure time of 10 msec and that of 500 msec.

At the low γ levels that experience has demonstrated desirable for harsh flash-illuminated photographs or reasonably high-contrast subjects (ocean waves, leaves, open fields) with regularly high density and high γ levels for underexposed negatives, there is a particularly beneficial effect. The longer printing times for low γ levels are necessary anyway for such stock because of the high density of the negative, and the rapid exposure times that dictate high γ levels are desirable for low-density negatives that demand short exposures. The range of printing times is accordingly not unnecessarily extended. If emulsion considerations do not favor such a decreasing curve, stock with a gradient curve $\gamma_b$ that increases from 2.5 to 3.5 between 10 and 500 msec as illustrated in FIG. 3 is always of advantage.

Figure 4:
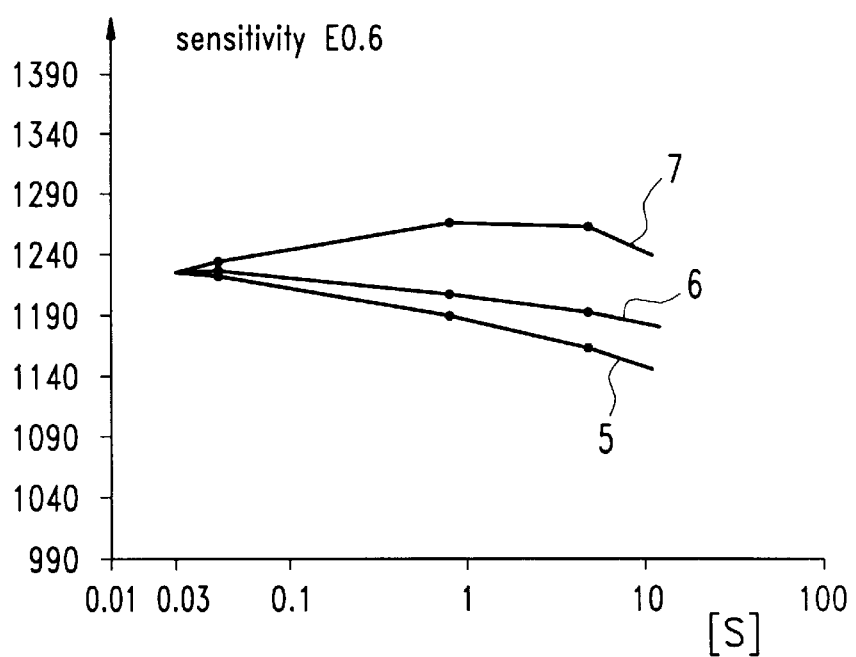
FIG. 4 illustrates the sensitivity-Schwarzchild-effect of the paper represented in FIG. 2 for exposures between 0.03 and 10 seconds.

FIG. 4 illustrates curves 5, 6, and 7, representing the relative sensitivities of the three layers of color for exposure times ranging from 0.03 to 10 seconds; i.e., the "sensitivity-Schwarzchild-effect" for the three layers. Knowledge of these values is necessary for adapting the printing-light quantities in the colors to the printing time T selected in accordance with the desired gradient. Due to their neutral position, the three curves have a common origin at 0.03 seconds and extend essentially downward to 10 seconds.

FIG. 5 illustrates a printer for printing on stock with the gradient illustrated in FIG. 2. A strip 25 of negative images is advanced by rollers 9 along a path 8 in direction 10. Distributed along path 8 are a density-detection slot 8a, a roller, and a printing window 8c. Slot 8a extends across the path. The roller can be raised and lowered to adjust the tension on the strip. Strip 25 travels past slot 8a, creates a loop 8b around the roller, and passes window 8c.

The density at each point of the negative is detected at slot 8a. Under the slot is a source 11 of light with a reflector and a convex lens. These components provide even white illumination through the slot over the total width of strip 25. The area of strip that matches the slot is mapped onto a light detector 13 by a mapping device 12, specifically a row of optical conductors. Light detector 13 comprises, as will be evident from FIG. 7, three rows 13a, 13b, and 13c of light-sensitive diodes. Each diode is matched with a filter that restricts its sensitivity to one of the three primary colors. Each row of diodes forwards to a memory in an exposure computer 14 the results obtained for ten areas per row. The rows are wide enough to ensure that each area is approximately square. Since diode rows 13a, 13b, and 13c are mutually displaced to at least the length of one area, each row will in accordance with its relation to the filters detect the densities of the areas in the particular color. The mutual displacement of the row of diodes and the resulting chronological displacement in the entry of the densities in computer 14 are compensated for by an instrument associated with the film-advance rollers, and the color densities detected for a particular area and entering the computer chronologically displaced will be collected again inside the memory. The overall detector is designed in accordance with the teaching of the U.S. Pat. No. 4,239,385. How the exposure computer functions will now be specified with reference to FIG. 5.

The prints are made with light deriving from a source 30. An appropriate reflector directs the light down along the device's optical axis. Maximal-density subtractive color filters 18a, 18b, and 18c in the form of at least two component filters are displaced into and out of the resulting beam in mutual opposition to various extents by stepped motors 17a, 17b, and 17c, accordingly coloring the beam. Motors 17a, 17b, and 17c are controlled by computer 14.

Below filters 18a, 18b, and 18c is a reducer in the form of a disk 20 that rotates on a shaft subject to a motor 21. The disk is perforated by arrays 20a, 20b, 20c, and 20d of different-size openings. Disk 20 is positioned next to but extending into the beam such that various arrays enter and leave the beam as the shaft rotates. The array 20a in the illustrated embodiment comprises only one opening and admits the total beam. Array 20b comprises several smaller openings and eliminates 50% of the light. Arrays 20c to 20d consist of increasingly smaller openings and eliminate another 50% of the light each. Other ratios can of course also be employed as needed. Which array is to be used with a particular negative is determined by computer 14.

Below disk 20 is a hollow blending shaft 19. Any irregularities in the distribution of light due to the introduction of filters 18a, 18b, and 18c and of arrays 20a, 20b, 20c, and 20d are eliminated in shaft 19 before the light reaches the negative at window 8c.

Below window 8c is a diaphragm 22, below diaphragm 22 a lens 24, and below lens 24 a shutter 15. The aperture of diaphragm 22 can be expanded and contracted by a motor 23 subject to computer 14. Lens 24 projects an image of the negative at window 8c onto a strip 31 of photographic stock. A shutter 15 subject to an electromagnet 16 blocks and unblocks the light shining on strip 31.

Figure 7:
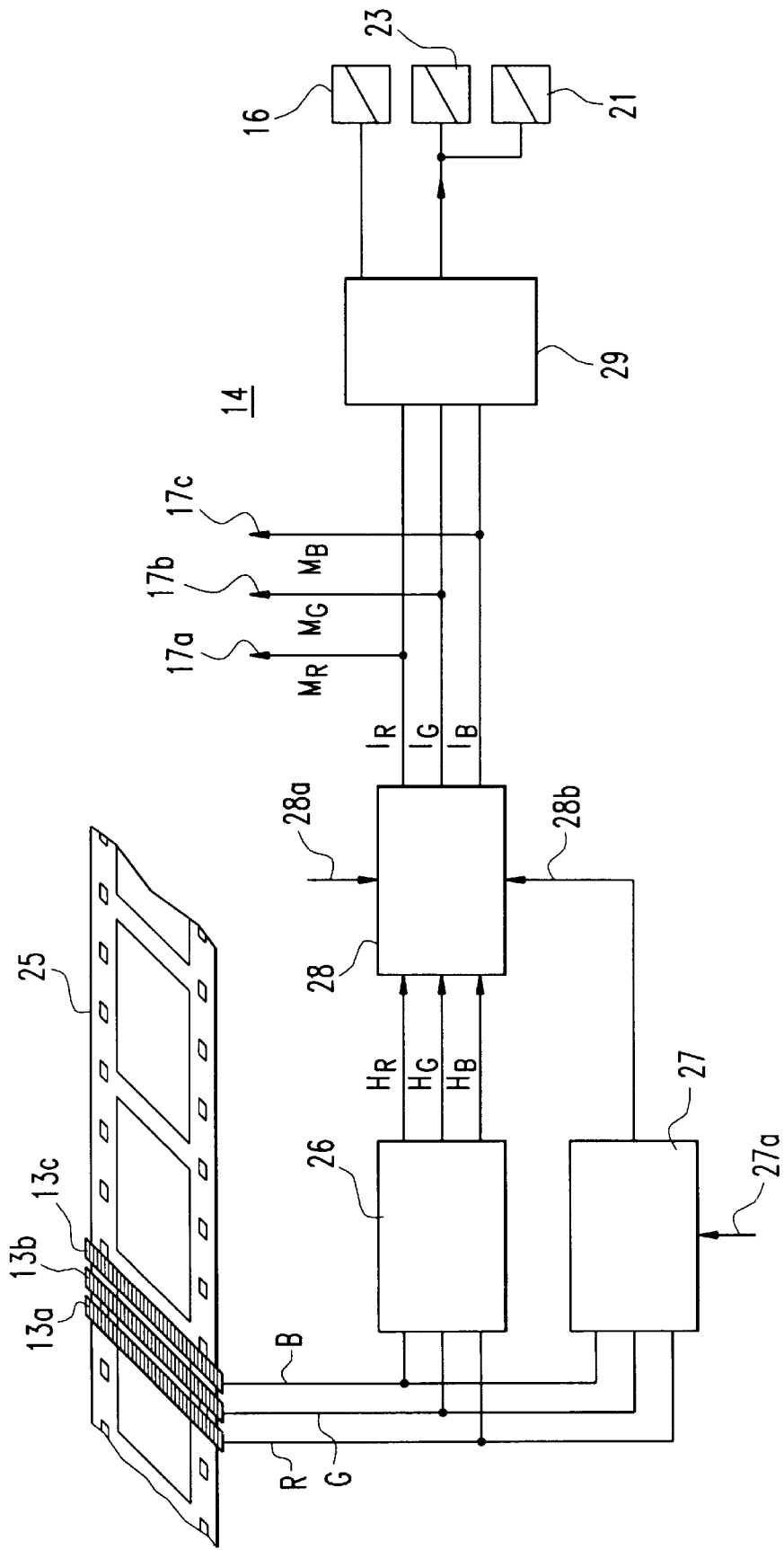
FIG. 7 is a diagram illustrating how prints are made in accordance with the present invention.

How the various components of computer 14 interact and how they affect the various settings in the printer illustrated in FIG. 5 will now be specified with reference to the block diagram in FIG. 7. Diode rows 13a, 13b, and 13c rest one beside another across and against the upper surface of negative strip 25. Diode rows 13a, 13b, and 13c are provided with appropriate color filters. Their output signals are forwarded to a processor 26 that computes printing-light quantities $H_R$, $H_G$, and $H_B$. The same signals are supplied to another processor 27 that automatically determines the correct printing-stock gradient for each negative.

The point of departure for analysis of the subject of the photograph is point-by-point detection and distribution of the results. The first parameter and the simplest to detect is the density range—the difference, that is, between the maximal and minimal densities. More precise analyses will then reveal severely underexposed negatives by their generally low density. A steep gradient will be necessary in this event. Negatives with large areas of very different density can be assumed to be back-lit photographs, which usually require a less steep gradient. This is also true of flash photographs. Some idea of the type of negative and necessary gradient can be obtained by comparing the detected density distribution with known subjects and using the appropriate gradient in the event of similarity.

The printing exposure time T resulting from gradient on the basis of the information concerning gradient as a function of exposure time represented in FIG. 2 is determined and forwarded to a third processor 28, which is also provided with printing light-quantity data for the colors $H_R$, $H_G$, and $H_S$. The third processor 28 is also provided with the information as to the sensitivity of each layer as a function of exposure time represented in FIG. 4. From the prescribed exposure time, the printing-light quantities obtained from first processor 26, and the Schwarzchild coefficient for sensitivity, third processor 28 now calculates for each of the three colors the requisite intensity of illumination $I_R$, $I_G$, and $I_B$ for the negative.

The filters 18a, 18b, and 18 in the path of the beam are now displaced by motors 17a, 17b, and 17c on the basis of these color intensities. Subsequent to this adjustment, each color will be represented in the exposure light for that negative at a percentage ensuring equally long exposure for each color. These exposures will of course be shorter than the unit exposure time T prescribed by computer 27a. Still another processor 29 is provided by third processor 28 with the three calculated intensities and calculates therefrom the total intensity of the illuminating light, from which the disk 20 (see also FIG. 6) roughly adjusts that intensity by means of a motor 21 and an iris diaphragm 22 fine-adjusts it by means of a motor 23. The requisite reduction in the intensity of the light at the negative can also be accomplished with only one assembly 20 and 21 or 22 and 23 if the subtractive color filters are advanced subject to computer control farther into the beam than is necessary for color compensation.

The exposure time T necessary for the particular gradient, finally, can be adhered to by opening and closing shutter 15 with electromagnet 16.

A total-film analysis program like that disclosed in U.S. Pat. No. 3,840,287 runs in a practical approach for the purpose of calculating the printing-light quantities for each of the three colors. The results or the data obtained from them can simultaneously be entered successively in a memory in first processor 26. The second processor 27 can determine the printing exposure time at practically the same rate and store it along with the empirical densities. Once the densities for all areas of all the negatives in the strip have been obtained, printing-light quantities $H_R$, $H_G$, and $H_B$ can be calculated as disclosed in U.S. Pat. No. 3,753,707.

In accordance with the aforesaid processing sequences accordingly, the particular overall exposure time T is initially prescribed from the density range of the negative and from the gradient as a function of exposure time, and the requisite quantity of printing light for the three colors is simultaneously determined for the particular negative, as disclosed in U.S. Pat. No. 3,753,707. The proportion of each color in the printing light is adjusted from the overall exposure time and the three printing-light quantities in the colors, and finally the ultimately requisite intensity of the colored printing light is established, roughly with the disk 20 (FIG. 6) and then precisely with the iris diaphragm 22. Once the necessary intensity has been established, electromagnet 16 can open the aperture and close it once again once exposure time T has elapsed.

The aforesaid sequence of adjustments results in accordance with the density range of each individual negative in a precisely controlled stock gradient. On the other hand, it is also possible to employ negatives with a mean gradient as a point of departure for a specific intermediate section of the density range and to abbreviate the exposure time only at a negative exposure-time density range of more than 1.8, for example, or extend it only at less than 0.8 in order to increase or decrease the slope of the represented in FIG. 2.

One problem that occurs in color printing, and not in black-and-white, is that every color separation from the negatives has its own density range, and the stock has a separate γ as a function of exposure time for each color layer. It is possible, on the one hand, to control the gradient only through the negative's gray-density range and a mean stock γ. On the other hand, it is also possible to select the negative color separation with the widest density range and to control the gradient in accordance with the γ for the particular color layer in question with a single exposure time. It is also possible, finally, to analyze the density range and γ value for the color layer involved in each individual color-exposure process, employing three separate timed color-exposure processes.

Finally, the γ can be entered in second processor 27 as a function of exposure time in accordance with the paper manufacturer's specifications or determined empirically by printing proofs at various exposure times.

There has thus been shown and described a novel method and apparatus for making photographic prints from negatives which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope be covered by the invention, which of the invention are deemed to be covered by the invention, which is to be limited only by the claims which follow.

What is claimed is:

1. Method of making photographic prints on printing stock from negatives that differ in density range, using a photographic printer having a variable printing time and intensity of exposure light, said method comprising the steps of selecting stock with a strong gradient-Schwarzchild-effect as a function of printing time to enable a gradient of the stock to be matched to the density range of a particular negative; and selecting the printing time and the intensity of the light that the negative is exposed to during printing to produce a desired density range on the printing stock for the particular negative wherein the gradient of color stock is selected by separately determining the gradient of each color layer as a function of exposure time, which is calculated from gray density and from a mean of the three color-layer gradients.

2. The method defined in claim 1, wherein in the density range of the particular negative and accordingly the stock gradient are automatically determined by scanning the particular negative point by point and comparing the resulting empirical distribution of densities of the negative with those of known photographic subjects.

3. The method defined in claim 1, wherein the sensitivity Schwarzchild effect is included along with the calculated quantity of printing light and the desired printing time in calculations of the intensity of the light to be employed to make a print from a particular negative.

4. The method defined in claim 1, wherein the gradient of color stock is selected by separately determining the gradient of each color layer as a function of exposure time, which is calculated from gray density and from a mean of the three color-layer gradients.

5. The method defined in claim 1, wherein when color prints are made, the density range for each negative is determined separately for each of its color separations, wherein the color separation with the widest density range is selected, and wherein the printing exposure time is determined in accordance with the selected gradient for that color separation.

6. The method defined in claim 1, wherein when color prints are made, the density range of each color separation is determined and a printing exposure time calculated for each color of light in accordance with the particular density range based on the gradient as a function of overall exposure time, and the printing exposures are carried out sequentially for each color.

7. The method defined in claim 1, wherein the gradient is selected only when the negatives are very flat and very harsh.

8. The method defined in claim 7, wherein the gradient is selected only when the density range is more than 1.8 or less than 0.8.

9. In apparatus for carrying out the method recited in claim 1 having a device that measures the density of the negatives point by point and a processor, responsive to the device, for determining either the density range or the type of exposure of the negative, the improvement comprising a second processor that calculates a desired gradient from the negative's densities and from the printing exposure time, a third processor that calculates the intensity of illumination ($I_R$, $I_G$, and $I_B$) for that exposure time as dictated by printing light quantities ($H_R$, $H_G$, and $H_B$) calculated from the negative's densities, and a light intensity control device arranged in the path of printing light.

10. The apparatus defined in claim 9, further comprising subtractive color filters that, when color prints are made, are automatically introduced into the light by means of at least one motor which is responsive to an exposure computer in order to coordinate the color-exposure times.

11. The apparatus defined in claim 9, wherein γ Schwarzchild levels are listed in a table in accordance with manufacturer's specifications.

12. The apparatus defined in claim 9, wherein γ Schwarzchild levels are listed from the evaluation of proofs.

13. The apparatus defined in claim 9, further comprising means for controlling the intensity of the light, said means comprising a reducer in the form of a disk that rotates on a shaft driven by a first motor and a diaphragm with an aperture controlled by a second motor.

14. Photographic printing stock for carrying out the method recited in claim 1, wherein its light-sensitive silverhalide suspension and other layer components ensure that when the stock is exposed and developed it will decrease in gradient (γ) from 3.5 to 2.5 over printing exposure times ranging from 10 to 500 msec.

15. The method defined in claim 1, wherein when color prints are made, the density range of each color separation is determined and a printing exposure time is calculated for each color of light in accordance with the particular density range based on the gradient as a function of overall exposure time, and when printing with white light the printing exposures are terminated by inserting color filters all the way into the light at intervals corresponding to the duration of the particular color-exposure times.

* * * * *